United States Patent
Gorday et al.

(10) Patent No.: US 7,209,755 B2
(45) Date of Patent: *Apr. 24, 2007

(54) METHOD OF TARGETING A MESSAGE TO A COMMUNICATION DEVICE SELECTED FROM AMONG A SET OF COMMUNICATION DEVICES

(75) Inventors: Paul Edward Gorday, West Palm Beach, FL (US); Robert Mark Gorday, Wellington, FL (US); Salvador Sibecas, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/235,302

(22) Filed: Sep. 26, 2005

(65) Prior Publication Data

US 2006/0073839 A1 Apr. 6, 2006

Related U.S. Application Data

(63) Continuation of application No. 10/135,614, filed on Apr. 30, 2002, now Pat. No. 7,024,207.

(51) Int. Cl.
*H04Q 7/20* (2006.01)

(52) U.S. Cl. .............................. 455/456.1; 455/456.2; 455/457

(58) Field of Classification Search ............. 455/456.1, 455/456.2, 457, 566; 701/213, 214, 215
See application file for complete search history.

(56) References Cited

U.S. PATENT DOCUMENTS

| | | | |
|---|---|---|---|
| 5,613,209 | A | 3/1997 | Peterson et al. |
| 6,069,895 | A | 5/2000 | Ayandeh |
| 6,204,844 | B1 | 3/2001 | Fumarolo et al. |
| 6,292,747 | B1 | 9/2001 | Amro et al. |
| 6,366,782 | B1 | 4/2002 | Fumarolo et al. |

OTHER PUBLICATIONS

John McCorkie, "Multimedia WPAN PHY Proposal"; XtremeSpectrum, Inc., IEEE Document No. 802.15-00/195r8, Oct. 20, 200, pp. 1-39.

*Primary Examiner*—Temica Beamer
(74) *Attorney, Agent, or Firm*—Lawrence J. Chapa

(57) ABSTRACT

A method for sending messages from a particular device to one or more other devices communicants (300) uses the relative geographic location of the targeted devices as addressing criteria. The particular device forms or joins a network of potential communicants, and exchanges information to determine their relative geographic location with respect to that of the particular device (310, 320). The relative geographic location is preferably defined by a directional component and a range component. The communication device then selects for communication those devices that meet specific criteria, such as a specific direction and range, and transmits a message to the selected devices (330, 332, 334, 336).

11 Claims, 4 Drawing Sheets

METHOD OF TARGETING A MESSAGE TO A COMMUNICATION DEVICE SELECTED FROM AMONG A SET OF COMMUNICATION DEVICES

CROSS REFERENCE TO RELATED APPLICATIONS

This application is a continuation of U.S. patent application Ser. No. 10/135,614, filed Apr. 30, 2002 now U.S. Pat. No. 7,024,207.

FIELD OF THE INVENTION

The present invention relates generally to wireless communication systems, and more specifically, to the targeting of messages to specific recipients in applications such as inter-vehicular communication and others.

BACKGROUND OF THE INVENTION

It is quite common to target a call or message to a particular device by specifying an address or other identifier that uniquely identifies the particular device. For example, a call to a mobile phone user is generally initiated by entering a phone number associated with that user, while an e-mail message or instant message to a mobile device is usually initiated by specifying a particular address associated with that device. However, in many instances, there is a need to communicate with one or more specific devices within a local vicinity when the addresses of those other devices are unknown. One example can be found in a meeting environment in which it is desirable to exchange contact information with one device but not another that may also be in communication range. Another example can be found in inter-vehicular communication, when it is desired to send to a particular vehicle selected from a number of surrounding vehicles.

Recently there have been significant efforts aimed at providing location determining capabilities in wireless products. Many of the proposals include the use of Global Positioning System (GPS) reception modules to decode signals transmitted from orbiting satellites to generate estimates of present location. The estimates of absolute location from GPS and other systems have been used in a variety of communication applications. The prior art teaches the use of the present location of a device to control certain communication parameters. For example, U.S. Pat. No. 5,613,209 issued to Petersen et al. on Mar. 18, 1997, for a METHOD AND APPARATUS FOR AUTOMATICALLY SELECTING A TALK GROUP, describes a situation in which location information obtained via GPS or otherwise is used to limit participation in a communication talk group. Here, communication devices are automatically assigned to a talk group when present within predefined geographic boundaries. Another example is described in U.S. Pat. No. 6,204,844 issued to Fumarolo et al. on Mar. 20, 2001, for a METHOD AND APPARATUS FOR DYNAMICALLY GROUPING COMMUNICATION UNITS IN A COMMUNICATION SYSTEM. Here, the location of communication devices is graphically displayed on a map, and an operator may use click and drag techniques to select particular communication devices for forming a talk group. While these references provide specific techniques for automatically or manually grouping communication units, they do not address the need to communicate with one or more specific devices within a local vicinity when the address of those other devices are unknown.

There remains a need in the area of targeted communications, such inter-vehicular communications, for a method of targeting a message to one of several devices, without specifying an address inherently associated with that device.

BRIEF DESCRIPTION OF THE DRAWINGS

Objects and advantages of the present invention will be more readily apparent from the following detailed description of preferred embodiments thereof when taken together with the accompanying drawings in which.

DETAILED DESCRIPTION OF THE PREFERRED EMBODIMENTS

While the above description is of the preferred embodiment of the present invention, it should be appreciated that the invention may be modified, altered, or varied without deviating from the scope and fair meaning of the following claims.

The present invention provides a procedure for sending messages from a particular communication device to one or more target communicants selected from a set of potential communicants based on relative geographic location. According to the procedure, the communication device and the potential communicants form a network of devices for exchanging information. The communication device obtains information from the other networked devices to determine their relative geographic location with respect to that of the communication device. The relative geographic location is defined by a directional component and preferably by a range component as well. The communication device then selects for communication a subset of these devices when their relative geographic location meets specific criteria, such as directional and range criteria, and transmits one or more messages to the selected devices.

Figure 1:
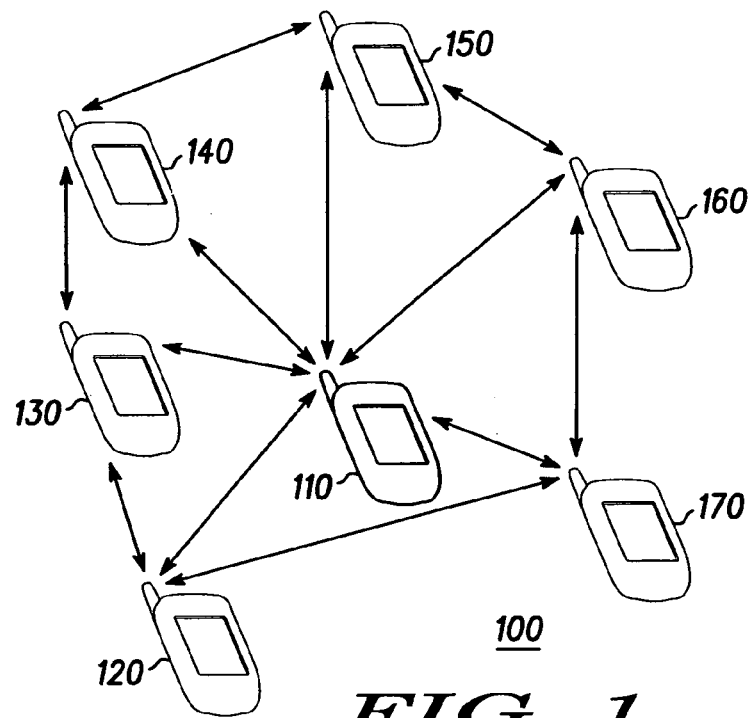
FIG. 1 is a diagram of several communication devices organized in a network in which a particular communication device targets another by specifying its relative location, in accordance with a first embodiment of the present invention.
Figure 2:
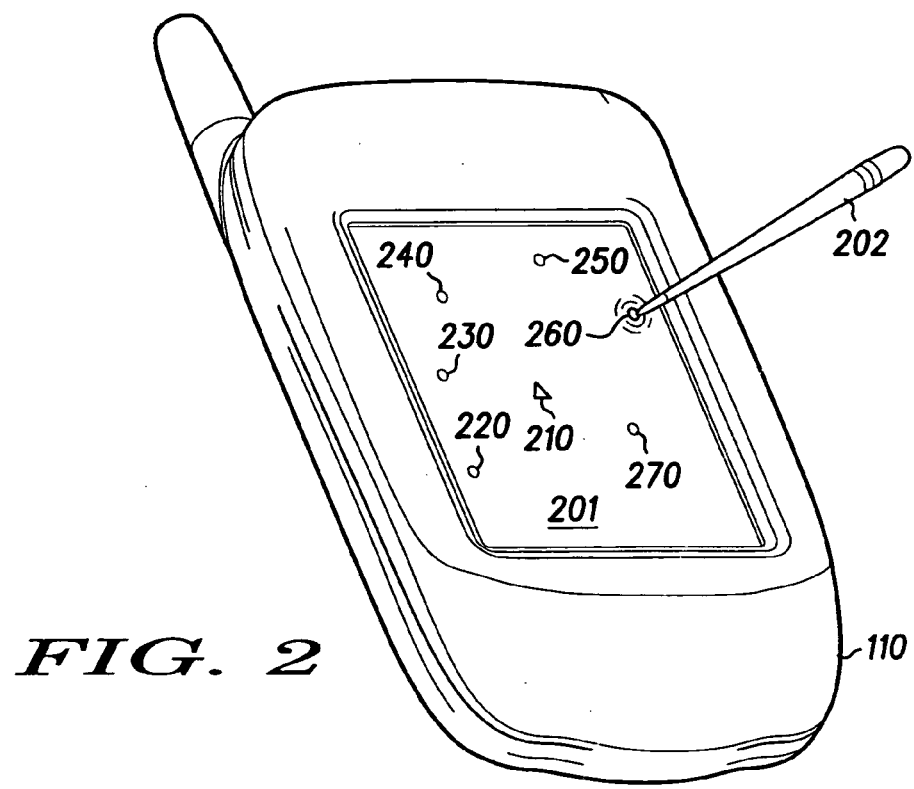
FIG. 2 shows in some detail the input and output device of the particular communication device, in accordance with the present invention.

FIG. 1 shows a set of communication devices 110, 120, 130, 140, 150, 160, 170 organized as a wireless network 100, in accordance with one embodiment of the present invention. In this embodiment, each device 110, 120, 130, 140, 150, 160, 170 is a handheld wireless communication module, such as a personal digital assistant (PDA), mobile telephone, or other similar wireless device. However, the invention is not so limited in scope, and the devices may vary in form, function, and construction. The devices 110, 120, 130, 140, 150, 160, 170 have been organized into a communication network. The network employs a protocol that allows for an exchange of setup information, and location information. Each device has the capability of determining the relative geographic location of another similarly equipped device, such as by analyzing transmission signals exchanged therebetween to obtain range and directional information, or by comparing specific location information available for each device to obtain such range and directional information. The illustration shows one of the devices 110 in the process of initiating communication according to the present invention. FIG. 2 shows this device 110 in more detail to illustrate additional functionalities of the devices. The device 110 has a touch screen display 201 that functions as a presentation or output device, and also as an input device when depressed by a stylus 205. As illustrated, the display 201 shows on the screen an iconic representation of the network. On the display 201, each device is represented by an icon, and the icons are arranged to show relative geographic locations in an appropriate scale. Particularly, an icon 210 represents the instant display device 110, while the other icons 220, 230, 240, 250, 260, 270 represent the other devices 120, 130, 140, 150, 160, 170 respectively. The illustration also shows one of the icon 260 representing device 160 being selected by the stylus input device 205 as a target message recipient for messages transmitted by the communication device 110.

Figure 3:
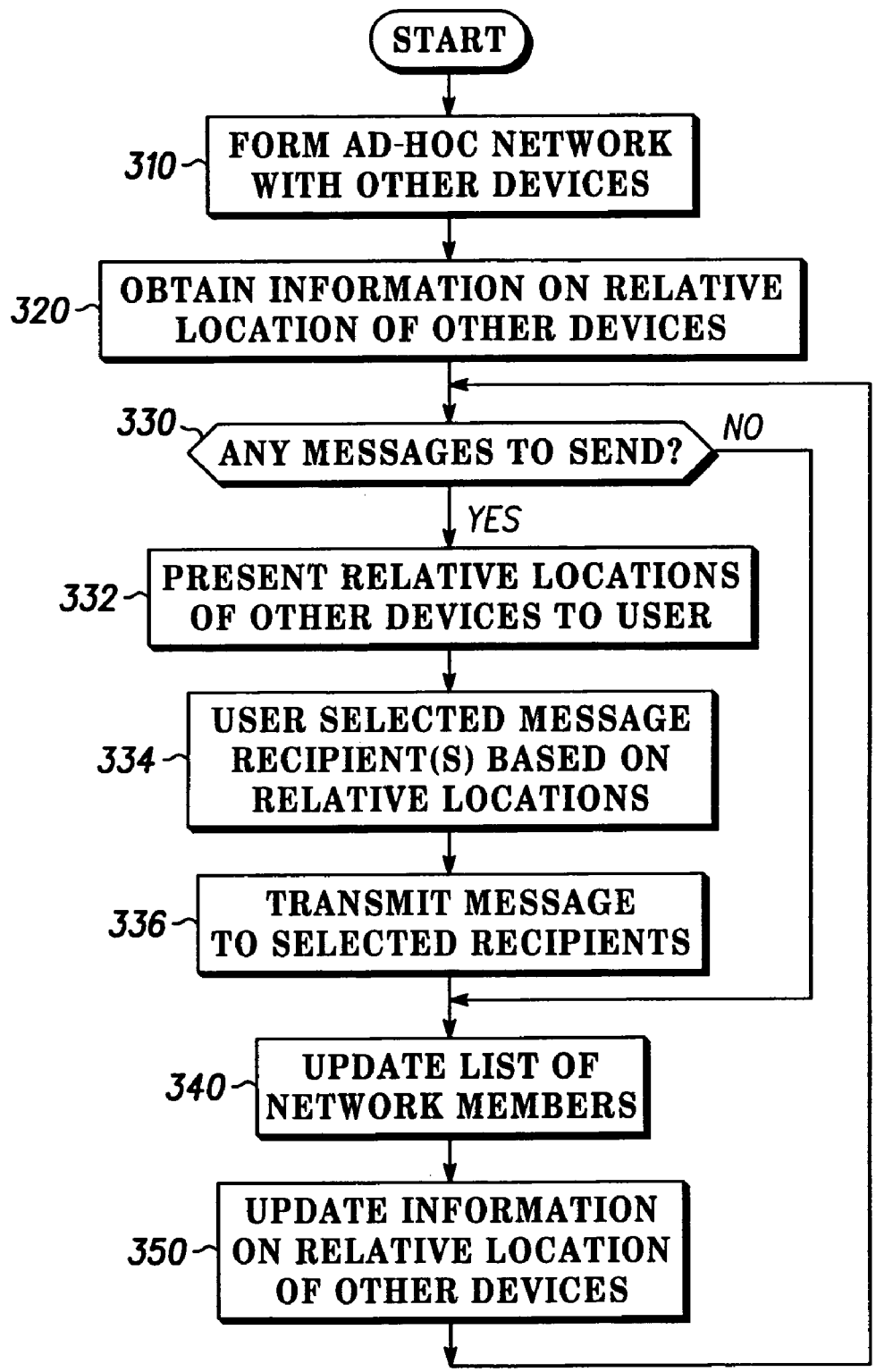
FIG. 3 is a flowchart of procedures for operating the particular communication device, in accordance with the present invention.

FIG. 3 shows a flowchart of procedures 300 executed by the communication device 110, in order to target a message to another of several communication devices in the particular environment, in accordance with the present invention. The instant communication device, upon entering the environment, forms a network with the other devices using a commonly supported network protocol, step 310. In the preferred embodiment, the network protocol supports a self-organizing network construction that is ad-hoc in nature, i.e., the number of communicating devices and the communication links among the devices change frequently. The instant device then communicates with the other network devices to obtain information on the geographic locations of those devices relative to the instant device, step 320. Preferably, the device determines relative location information by analyzing signals and/or data received from the other devices to compute range and directional information. In this case, absolute location information is not necessary. However, if such absolute location information is available, the device may derive the relative location information by comparing the absolute location information available for each device to obtain such range and directional information. In conjunction with the desire to send messages to a targeted device, the instant device then presents the relative geographic locations of the communication devices in the network on an output device, step 332, and accepts an input indicative of relative location for the targeted device, step 334. Preferably, the device presents a graphical representation of the network in which the device is centrally represented by an icon, and all of the other devices are represented by icons all arranged about this icon according to their respective relative geographic locations. Alternatively, the relative geographic locations are presented by displaying a list of coordinates representing the communication devices. The device then prompts the user to select one of the devices to target for communication. The user uses the stylus or other input mechanism to select, such as via the touch screen, the targeted device in order to initiate communication. In this manner, the communication device selects for communication at least one device from the network of devices based at least in part on the obtained relative geographic location information, and transmits a message to the selected devices, step 336. In one embodiment, the device enhances the selectivity of the message transmission by encoding relative location information within the message as an address component for selectively limiting recipients of the message. As the devices of the network are mobile, the instant device maintains an up-to-date list of network members and their relative locations based its interaction with those members, steps 340, 350.

Figure 4:
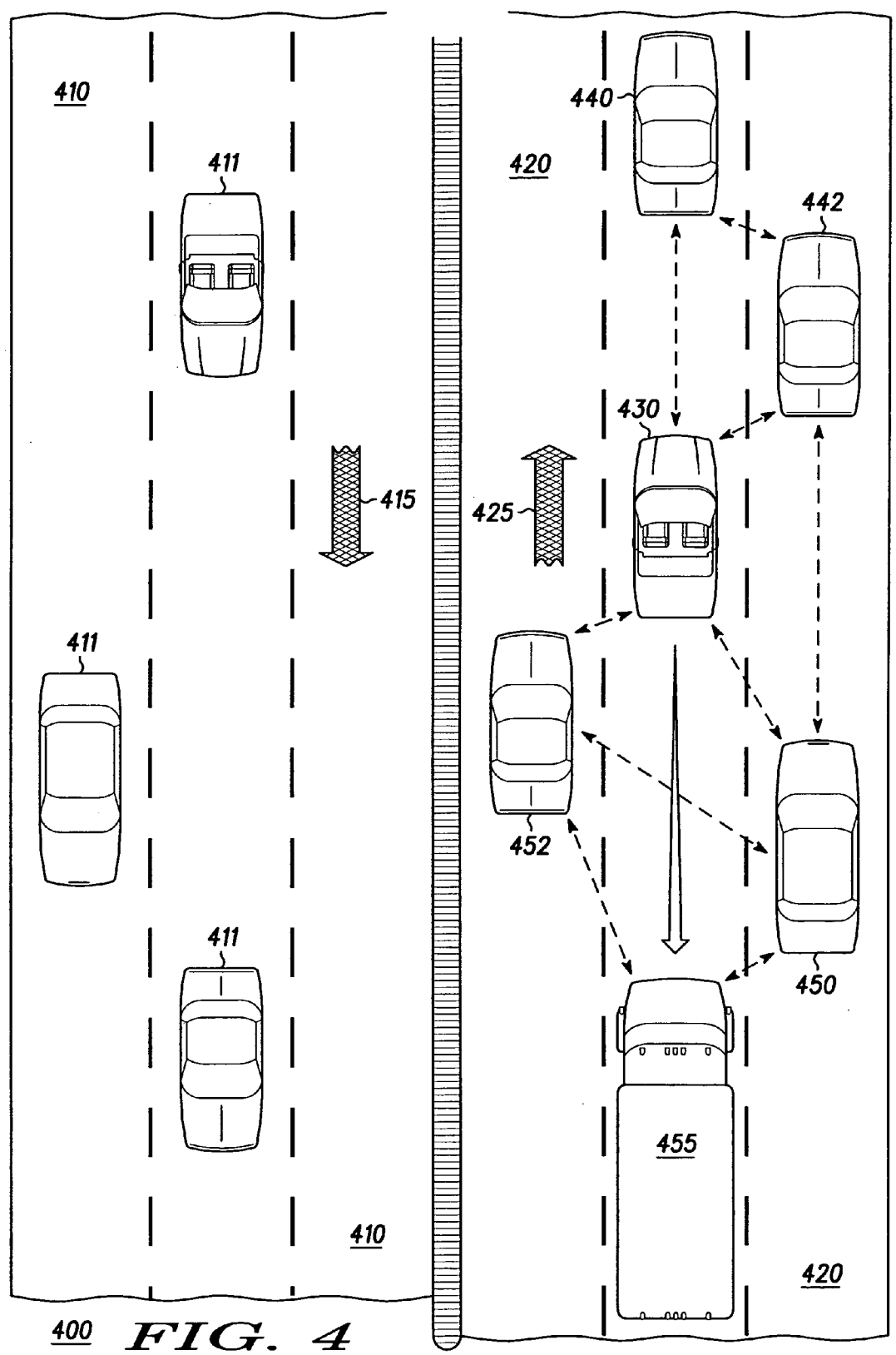
FIG. 4 is a diagram depicting a network of communicating vehicles operating in a highway environment in which a particular vehicle transmits to other vehicles automatically selected by their relative location, in accordance with a second embodiment of the present invention.

FIG. 4 shows an environment 400 consisting of set of vehicles operating on a highway, in accordance with another embodiment of the present invention. In this embodiment, one road 410 is shown with vehicles 411 having a first direction of travel 415, while another road 420 is shown with vehicles 430, 440, 442, 450, 452, 455 having a second direction of travel 425 opposite to that of the first direction of travel. The vehicles 411, 430, 440, 442, 450, 452, 455 are equipped with wireless communication modules, and are capable of establishing or participating in a network. The vehicles 430, 440, 442, 450, 452, 455 are illustrated as being within communication range with one another and are organized into a communication network. Similar to the network described with respect to FIG. 1, the network employs a protocol that allows for an exchange of setup information, and location information. Additionally, each vehicle has the capability of determining the relative geographic locations of other similarly equipped vehicles such as by analyzing transmission signals exchanged therebetween to obtain range and directional information, or by comparing specific location information available for each vehicle to obtain such range and directional information The vehicles are also capable of exchanging vehicular status information, such as information on braking status, speed, acceleration, turn signal indicator position, and the like. A first vehicle 440 is shown sending a braking signal to a second vehicle 455 that is traveling behind it with respect their direction of travel 425, after having automatically selecting only this vehicle 455 from among the other vehicles 430, 440, 442, 450, 452, 455, based on its relative location to the first vehicle 440.

Figure 5:
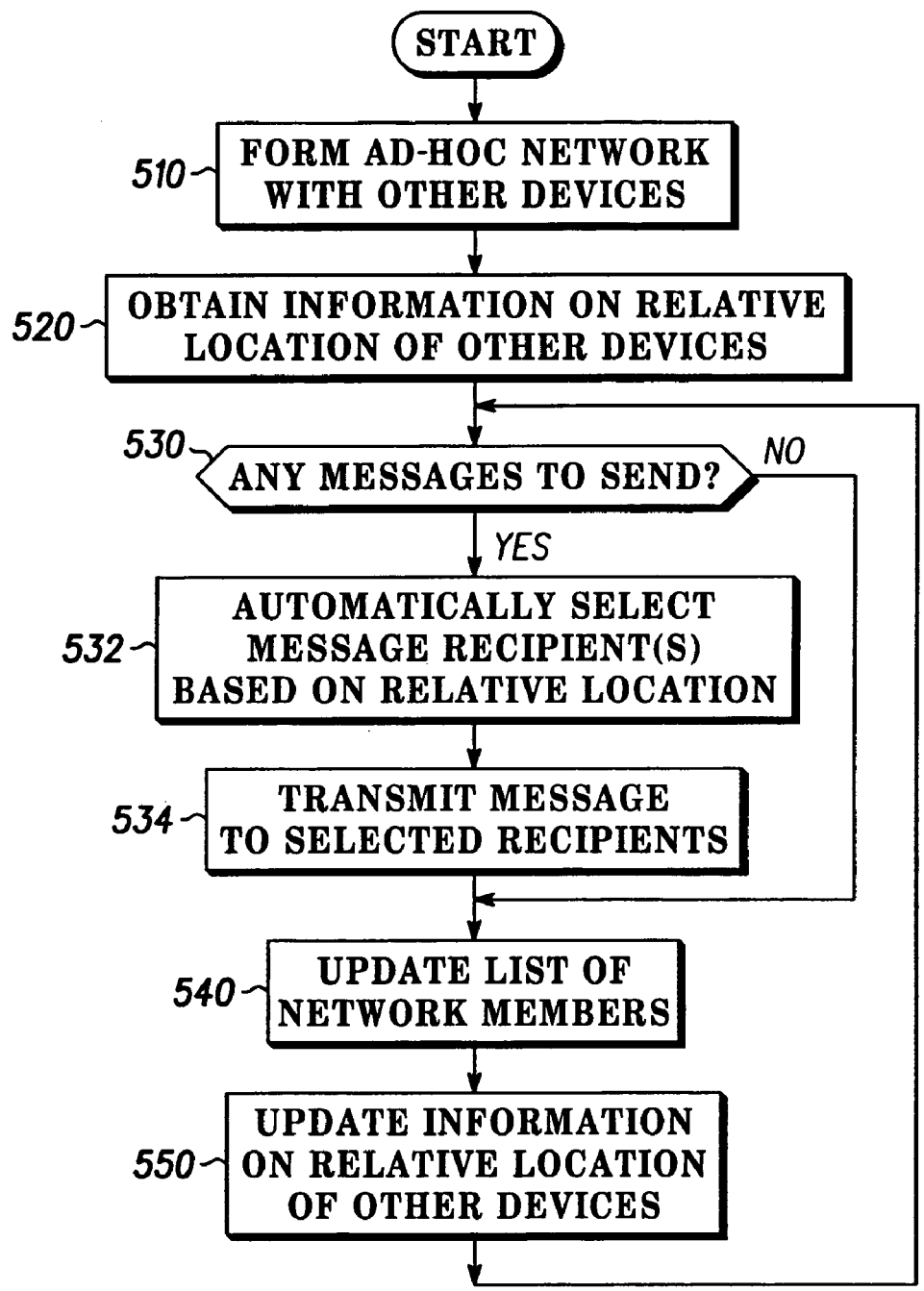
FIG. 5 is a flowchart of procedures for operating the particular vehicle of FIG. 4, in accordance with the present invention.

FIG. 5 shows a flowchart of procedures 500 executed at a particular vehicle, such as the vehicle 430, via its wireless communication module, in order to target a message of vehicular status to one or more potentially affected vehicles, in accordance with the present invention. At a given point in dime, the particular vehicle uses a commonly supported network protocol to form or join an ad-hoc network with other vehicles within communication range and having a direction of travel consistent with that of the particular vehicle, step 510. The particular vehicle frequently communicates with the other vehicles participating in the network in order to obtain information on the relative geographic locations of those vehicles, step 520. The relative location information is preferably in the form of directional and range information, and is computed using common ranging techniques such as an analysis of signal strength, time difference of arrival techniques, or by comparing absolute location information, when available and sufficiently accurate. When a vehicular status is available that potentially affects vehicles having a location that satisfies a predetermined criteria, the particular vehicle automatically selects that subset of vehicles satisfying the predetermined criteria 530, 532, and transmits a message to those vehicles selected, which message contains the vehicular status, step 534. Preferably, the predetermined criteria is expressed as a specific direction and/or predetermined range. According to one embodiment of the invention, the specific direction is determined and characterized in relative form as "in front of" or "behind" or "beside" or some other generalized form. When the particular vehicle is braking, for example, which potentially affects those vehicles that are behind the particular vehicle, the particular vehicle identifies the subset networked vehicles characterized as being behind the particular vehicle, with respect to the particular direction of travel. Thus, based at least in part on the obtained relative location information, the particular vehicle automatically selects to receive the vehicle status signal only those vehicles that are located in that behind the particularly vehicle. Similarly, a particular vehicle having a status message that potentially affects those vehicles that are in front of the particular vehicle will automatically target only those vehicles in front for transmission of the status message. As the vehicles are expected to constantly change their relative location or network membership, the instant vehicle maintains an up-to-date list of network members and their relative locations based upon its interaction with those members, steps 540, 550.

The present invention has significant advantages over the prior art. By using relative geographic information, such as direction and range, to limit message recipients, messages can be targeted to selected potential communicants without specific knowledge of an address uniquely associated with those communicants. This provides substantial flexibility in ad-hoc address situations, and is particularly useful for inter-vehicular communication of status information.

While the above description is of the preferred embodiment of the present invention, it should be appreciated that the invention may be modified, altered, or varied without deviating from the scope and fair meaning of the following claims.

What is claimed is:

1. A method of sending a message from a communication device to another communication device selected from a plurality of communication devices, the method comprising the steps of:

forming a network with the plurality of communication devices;

obtaining information on relative geographic locations, with respect to the communication device, for the plurality of communication devices;

selecting for communication at least one device from the plurality of communication devices based at least in part on the obtained relative geographic location information including automatically choosing by the communication device the at least one device based on direction of the location of the at least one device relative to the communication device; and transmitting a message to the at least one device.

2. The method of claim 1, wherein the relative geographic location information comprises relative directional information.

3. The method of claim 1, wherein automatically choosing the at least one device based on direction relative to the communication device includes automatically selecting only devices of the plurality of communication devices that are located in a specific direction relative to the communication device.

4. The method of claim 3, wherein the specific direction is one of in front of or behind the communication device.

5. In a particular vehicle having a particular direction of travel, a method of operating a vehicle messaging system, comprising the steps of:

joining a communication network comprising a plurality of vehicles having a direction of travel consistent with the particular direction of travel;

obtaining information on relative location for the plurality of vehicles;

selecting a subset of the plurality of vehicles that have a relative location, with respect to the particular vehicle, that satisfies a predetermined criteria, where the subset can include multiple vehicles; and transmitting a message from the particular vehicle directly to the subset of the plurality of vehicles.

6. The method of claim 5, wherein the predetermined criteria comprises a predetermined range and a predetermined direction.

7. The method of claim 6, wherein the predetermined direction is one of in front of or behind with respect to the particular direction of travel.

8. The method of claim 5, wherein the step of transmitting comprises the step of encoding relative location information as an address component for selectively limiting recipients of the message.

9. In a particular vehicle having a particular direction of travel, a method of operating a vehicle messaging system, comprising the steps of:

forming a communication network comprising a plurality of vehicles having a direction of travel consistent with the particular direction of travel;

generating relative location information for the plurality of vehicles;

automatically selecting by the vehicle messaging system of the particular vehicle a subset of the plurality of vehicles characterized as located toward a specific direction and within a specific range of the particular vehicle, with respect to the particular direction of travel, based at least in part on the obtained relative location information, where the subset can include multiple vehicles; and transmitting vehicular status information from the particular vehicle directly to the selected subset of the plurality of vehicles.

10. The method of claim 9, wherein the step of automatically selecting comprises the step of selecting only those vehicles characterized as being behind the particular vehicle.

11. A method of sending a message from a communication device to another communication device selected from a plurality of communication devices, the method comprising the steps of:

forming an ad-hoc, self organizing, peer-to-peer network with the plurality of communication devices;

obtaining information on relative geographic locations, with respect to the communication device, for the plurality of communication devices;

selecting for communication at least one peer device from the plurality of communication devices based at least in part on the obtained relative geographic location information; and transmitting a message directly to the at least one peer device.

* * * * *